(12) United States Patent
Kanamori et al.

(10) Patent No.: US 12,269,946 B2
(45) Date of Patent: Apr. 8, 2025

(54) MOLDED ARTICLE AND METHOD FOR PRODUCING MOLDED ARTICLE

(71) Applicant: MITSUBISHI CHEMICAL CORPORATION, Tokyo (JP)

(72) Inventors: Yuya Kanamori, Tokyo (JP); Norihito Sakai, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 603 days.

(21) Appl. No.: 17/486,095

(22) Filed: Sep. 27, 2021

(65) Prior Publication Data

US 2022/0010128 A1 Jan. 13, 2022

Related U.S. Application Data

(63) Continuation-in-part of application No. PCT/JP2020/013275, filed on Mar. 25, 2020.

(30) Foreign Application Priority Data

Mar. 29, 2019 (JP) ................................. 2019-065505

(51) Int. Cl.
| | |
|---|---|
| C08L 67/04 | (2006.01) |
| B29C 45/00 | (2006.01) |
| B29C 45/76 | (2006.01) |
| B29C 55/00 | (2006.01) |
| B29K 29/00 | (2006.01) |
| B29K 67/00 | (2006.01) |
| B29L 31/00 | (2006.01) |

(52) U.S. Cl.
CPC .......... C08L 67/04 (2013.01); B29C 45/0001 (2013.01); B29C 45/7646 (2013.01); B29C 55/005 (2013.01); B29K 2029/04 (2013.01); B29K 2067/04 (2013.01); B29K 2995/006 (2013.01); B29K 2995/0067 (2013.01); B29L 2031/7174 (2013.01); C08L 2203/30 (2013.01); C08L 2205/14 (2013.01)

(58) Field of Classification Search
CPC .......... B29K 2067/04; B29K 2067/046; B29K 2429/04; B29K 2229/04; B29K 2029/04; B29K 2467/04; B29K 2467/046; B29K 2267/04; B29K 2267/046; B29L 2031/7174; C08L 67/04; C08L 29/04
USPC ............................................. 428/34.1–36.92
See application file for complete search history.

(56) References Cited

U.S. PATENT DOCUMENTS

| | | | |
|---|---|---|---|
| 4,243,627 A | 1/1981 | Kornbaum | |
| 4,309,465 A * | 1/1982 | Kornbaum | B29C 48/022 |
| | | | 428/522 |
| 4,774,114 A | 9/1988 | Moritani et al. | |
| 5,200,247 A * | 4/1993 | Wu | C08L 67/04 |
| | | | 428/338 |
| 5,334,634 A * | 8/1994 | Bastiolo | C08L 3/02 |
| | | | 524/52 |
| 5,380,479 A | 1/1995 | Schrenk et al. | |
| 5,945,480 A * | 8/1999 | Wang | D01F 6/92 |
| | | | 525/411 |
| 6,649,103 B1 * | 11/2003 | Bousmina | C08L 27/08 |
| | | | 264/211 |
| 9,296,887 B2 | 3/2016 | Shibutani et al. | |
| 10,710,342 B2 | 7/2020 | Inoue et al. | |
| 11,578,200 B2 * | 2/2023 | Kuhl | B29C 45/60 |
| 2002/0065363 A1 * | 5/2002 | Wang | C08L 67/04 |
| | | | 525/58 |
| 2009/0250370 A1 * | 10/2009 | Whitchurch | B29C 48/18 |
| | | | 206/524.2 |
| 2010/0119749 A1 | 5/2010 | Twist | |
| 2010/0215879 A1 | 8/2010 | Dooley et al. | |
| 2011/0126497 A1 * | 6/2011 | Bauer | B32B 27/306 |
| | | | 156/244.11 |
| 2011/0196071 A1 * | 8/2011 | Mentink | C08L 51/08 |
| | | | 524/51 |
| 2012/0149844 A1 * | 6/2012 | Whitehouse | C08J 3/005 |
| | | | 525/58 |
| 2013/0045308 A1 * | 2/2013 | Gorbatenko | B65D 85/8061 |
| | | | 426/394 |
| 2014/0004350 A1 * | 1/2014 | Shibutani | B32B 27/306 |
| | | | 428/480 |
| 2014/0080968 A1 * | 3/2014 | Quintana | D01F 6/50 |
| | | | 525/61 |

(Continued)

FOREIGN PATENT DOCUMENTS

| | | | |
|---|---|---|---|
| EP | 0 015 556 A1 | 9/1980 | |
| EP | 0 218 245 A2 | 4/1987 | |

(Continued)

OTHER PUBLICATIONS

ISR issued in WIPO Patent Application No. PCT/JP2020/013275, Jun. 23, 2020, English translation.
Extended European Search Report issued in EP Patent App. No. 20782569.6, Apr. 5, 2022.
XP055905582, Restrepo et al. "The effect of molecular weight and hydrolysis degree of poly (vinyl alcohol) (PVA) on the thermal and mechanical properties of poly (lactic acid)/PVA blends", Polimeros: Ciencia Y Tecnologia, vol. 28, No. 2, Jan. 1, 2018, pp. 169-177.
Office Action issued Mar. 6, 2024 in Chinese patent application No. 202080025891.X, with English machine translation thereof.

(Continued)

Primary Examiner — Michael C Romanowski
(74) Attorney, Agent, or Firm — GREENBLUM & BERNSTEIN, P.L.C.

(57) ABSTRACT

As a molded article that has gas barrier properties even if a gas barrier layer is not provided and that also has molding stability and biodegradability, there is proposed a molded article containing an aliphatic polyester-based resin (A) and a polyvinyl alcohol-based resin (B) as main component resins, wherein the molded article has a resin phase-separated structure having a continuous phase including the aliphatic polyester-based resin (A) as a main component, and a ribbon-like dispersed phase including the polyvinyl alcohol-based resin (B) as a main component.

12 Claims, No Drawings

(56) References Cited

U.S. PATENT DOCUMENTS

| | | | | |
|---|---|---|---|---|
| 2014/0120062 | A1* | 5/2014 | Cruz | C08K 5/1545 |
| | | | | 521/134 |
| 2014/0308534 | A1* | 10/2014 | Inoue | C09J 4/06 |
| | | | | 428/483 |
| 2015/0337129 | A1 | 11/2015 | Sakai et al. | |
| 2016/0120727 | A1* | 5/2016 | Harreld | B29C 48/21 |
| | | | | 264/145 |
| 2017/0008694 | A1* | 1/2017 | Andreae | B65D 65/466 |
| 2017/0037241 | A1* | 2/2017 | Schmidt | B65D 85/8043 |
| 2019/0016528 | A1* | 1/2019 | Kuhl | B65D 65/466 |
| 2020/0307056 | A1* | 10/2020 | Macinnis | B29C 48/21 |
| 2021/0038726 | A1* | 2/2021 | Magistrali | A61K 47/36 |

FOREIGN PATENT DOCUMENTS

| | | | |
|---|---|---|---|
| EP | 0 337 719 A2 | 10/1989 | |
| JP | S63-275644 | 11/1988 | |
| JP | H01-261426 | 10/1989 | |
| JP | H05-017590 A | 1/1993 | |
| JP | H05-084876 A | 4/1993 | |
| JP | 07188532 A * | 7/1995 | |
| JP | H07-286082 A | 10/1995 | |
| JP | H08302173 A * | 11/1996 | C08L 101/16 |
| JP | 2000136299 A * | 5/2000 | |
| JP | 2001-072822 A | 3/2001 | |
| JP | 2002-371201 A | 12/2002 | |
| JP | 2003-113254 A | 4/2003 | |
| JP | 2007211129 A * | 8/2007 | |
| JP | 2013-071968 A | 4/2013 | |
| JP | 2013-212682 A | 10/2013 | |
| JP | 2014-512413 A | 5/2014 | |
| JP | 2014-118541 A | 6/2014 | |
| JP | 2014-122295 A | 7/2014 | |
| WO | 2012/023779 | 2/2012 | |

* cited by examiner

MOLDED ARTICLE AND METHOD FOR PRODUCING MOLDED ARTICLE

This application is a Continuation-In-Part of PCT/JP2020/013275 filed Mar. 25, 2020, and claims the priority benefit of Japanese application 2019-065505 filed Mar. 29, 2019, the contents of which are expressly incorporated by reference herein in their entireties.

TECHNICAL FIELD

The present invention relates to a molded article containing an aliphatic polyester-based resin and a polyvinyl alcohol-based resin.

BACKGROUND ART

Plastics are excellent in moldability, strength, water resistance, transparency, and the like and therefore are widely used as packaging materials. Examples of such plastics used for packaging materials can include polyolefin-based resins such as polyethylene and polypropylene, vinyl-based resins such as polystyrene and polyvinyl chloride, and aromatic polyester-based resins such as polyethylene terephthalate. But these plastics are poor in biodegradability, and when they are dumped in nature after use, they remain for a long period and may spoil the landscape and cause environmental destruction.

In contrast to this, in recent years, biodegradable resins that are biodegraded or hydrolyzed in soil and in water and are useful for the prevention of environmental pollution have attracted attention, and their practical use has been promoted. As such biodegradable resins, aliphatic polyester-based resins, cellulose acetate, modified starch, and the like are known. As packaging materials, aliphatic polyester-based resins, particularly polylactic acid, excellent in transparency, heat resistance, and strength are preferred.

There are proposed molded articles obtained by melting and molding a resin composition including a polyvinyl alcohol-based resin, an aliphatic polyester, and an alkali metal salt. (See, for example, Patent Literature 1.)

In addition, there are proposed laminates in which an aliphatic polyester-based resin layer and a polyvinyl alcohol-based resin layer are laminated via an adhesive layer, and as such an adhesive layer, an adhesive having good adhesiveness to both the aliphatic polyester-based resin and the polyvinyl alcohol-based resin and biodegradable is used, and thus good interlayer adhesiveness is provided, and all components are biodegradable. (See, for example, Patent Literature 2.)

CITATION LIST

Patent Literature

Patent Literature 1: Japanese Patent Laid-Open No. 05-84876
Patent Literature 2: Japanese Patent Laid-Open No. 2013-212682

SUMMARY OF INVENTION

Technical Problem

Aliphatic polyester-based resins have insufficient oxygen barrier properties and therefore are unsuitable to be used singly as packaging materials for contents that may undergo oxidative deterioration, such as food and drugs. Accordingly, Patent Literature 1 proposes a laminate obtained by laminating a layer including polyvinyl alcohol excellent in oxygen barrier properties on a layer including an aliphatic polyester-based resin.

In addition, in Patent Literature 2, an aliphatic polyester-based resin layer and a PVA-based resin layer are formed into a laminate to improve gas barrier properties.

However, the aliphatic polyester-based resin and the polyvinyl alcohol-based resin ("polyvinyl alcohol" may be hereinafter abbreviated as "PVA") have greatly different surface characteristics and therefore are poor in adhesiveness, and it has been difficult to obtain practical interlayer adhesive strength by the direct lamination of both layers.

Further, in order to make and process the laminate described in Patent Literature 2, a multilayer film forming machine and a multilayer sheet molding machine for at least three types and five layers and a vacuum molding apparatus are also needed, and the laminate has not been able to be easily made and has been practically insufficient.

Accordingly, under the background as described above, it is an object of the present invention to provide a new molded article that can have gas barrier properties even if a gas barrier layer is not specially laminated and that can also have molding stability and biodegradability.

Solution to Problem

In order to achieve such an object, the present invention proposes a molded article including a resin layer containing an aliphatic polyester-based resin (A) and a polyvinyl alcohol-based resin (B) as main component resins, wherein the resin layer has a resin phase-separated structure having a continuous phase including the aliphatic polyester-based resin (A) as a main component, and a ribbon-like dispersed phase including the polyvinyl alcohol-based resin (B) as a main component.

The present invention also proposes a molded article including a resin layer obtained by dry-blending and molding pellets (A1) including an aliphatic polyester-based resin (A) as a main component, and pellets (B1) including a polyvinyl alcohol-based resin (B) as a main component, wherein an absolute value of a difference between a melt viscosity of the aliphatic polyester-based resin (A) at 210° C. ($\eta A$) and a melt viscosity of the polyvinyl alcohol-based resin (B) at 210° C. ($\eta B$) ($|\eta A - \eta B|$) is 100 Pa·s or more.

The present invention also proposes a method for producing a molded article, including dry-blending and injection-molding pellets (A1) including an aliphatic polyester-based resin (A) as a main component, and pellets (B1) including a polyvinyl alcohol-based resin (B) as a main component.

The present invention also proposes a method for producing a molded article, including dry-blending and sheet-molding pellets (A1) including an aliphatic polyester-based resin (A) as a main component, and pellets (B1) including a polyvinyl alcohol-based resin (B) as a main component, and then stretching a sheet obtained by the sheet molding in one axial direction or two axial directions.

Advantageous Effects of Invention

The molded article proposed by the present invention has a low oxygen transmission rate and is excellent in gas barrier properties even if a gas barrier layer is not specially laminated. In addition, the aliphatic polyester-based resin (A)

and the polyvinyl alcohol-based resin (B) are both biodegradable resins, and therefore the molded article proposed by the present invention can also have biodegradability.

Thus, the molded article proposed by the present invention has biodegradability and can have a low oxygen transmission rate and be excellent in gas barrier properties, and therefore, for example, a container such as a coffee capsule containing as a main component the molded article proposed by the present invention can be provided as a biodegradable product.

DESCRIPTION OF EMBODIMENTS

One example of an embodiment of the present invention will be described in detail below. However, the embodiment shows one example and is not specified to these contents.
<<Present Molded Article>>

A molded article according to one example of an embodiment of the present invention (referred to as "the present molded article") is a molded article including a resin layer containing an aliphatic polyester-based resin (A) and a polyvinyl alcohol-based resin (B) as main component resins (referred to as "the present resin layer").

Here, the "containing as main component resins" means that the total content (% by mass) of the aliphatic polyester-based resin (A) and the polyvinyl alcohol-based resin (B) is 50% by mass or more of the total content (% by mass) of the resins constituting the present resin layer, and also means that the total content (% by mass) of the aliphatic polyester-based resin (A) and the polyvinyl alcohol-based resin (B) may be especially 70% by mass or more, especially 80% by mass or more, and especially 90% by mass or more (including 100% by mass).

The present molded article may have a single layer configuration including the present resin layer and may have a multilayer configuration including two or more layers obtained by laminating the present resin layer and "another layer or other layers."

In the present molded article, a gas barrier layer need not be specially laminated, but it is not denied that other layers are laminated. Other layers will be described later.
<Present Resin Layer>

The present resin layer is a layer containing the aliphatic polyester-based resin (A) and the polyvinyl alcohol-based resin (B) as main component resins and preferably has a resin phase-separated structure having a continuous phase including the aliphatic polyester-based resin (A) as a main component, and a ribbon-like dispersed phase including the polyvinyl alcohol-based resin (B) as a main component.

Here, the "main component" of the continuous phase including the aliphatic polyester-based resin (A) as a main component means a component having the highest mass proportion among the components constituting the continuous phase. Especially, the aliphatic polyester-based resin (A) may account for 50% by mass or more, especially 70% by mass or more, especially 80% by mass or more, and especially 90% by mass or more (including 100% by mass) of the components constituting the continuous phase. The same applies to the "main component" of the ribbon-like dispersed phase including the polyvinyl alcohol-based resin (B) as a main component.

The ribbon-like dispersed phase preferably has an average length (L1) of 6 μm or more and 100 μm or less, an average thickness (L2) of 0.1 μm or more and 5 μm or less, and a ratio of the average length (L1) to the average thickness (L2) (L1/L2) of 5 or more and 100 or less. When the present resin layer has such a ribbon-like dispersed phase, the effect of excellent oxygen barrier properties can be enjoyed.

The average length (L1) of the ribbon-like dispersed phase is preferably 6 μm or more and 100 μm or less and further preferably, especially 20 μm or more or 90 μm or less and among them 30 μm or more or 80 μm or less.

The average thickness (L2) is preferably 0.1 μm or more and 5 μm or less and further preferably, especially 0.3 μm or more or 4 μm or less and among them 1.0 μm or more or 3 μm or less.

The ratio of the average length (L1) to the average thickness (L2) (L1/L2) is preferably 5 or more and 100 or less and further preferably, especially 6 or more or 60 or less, and among them 7 or more or 50 or less, and among them 8 or more or 40 or less.

The average length (L1) and average thickness (L2) of the ribbon-like dispersed phase can be obtained by cutting the present resin layer in the thickness direction in at least one place in the present molded article, choosing at least 10 arbitrary ribbon-like dispersed phase portions on the cut surface, measuring the respective lengths and thicknesses, and obtaining the respective average values.

The ratio between the content (mass) of the aliphatic polyester-based resin (A) and the content (mass) of the polyvinyl alcohol-based resin (B) in the present resin layer is preferably aliphatic polyester-based resin (A)/polyvinyl alcohol-based resin (B)=99/1 to 51/49 and further preferably, especially 90/10 to 55/45, and among them 85/15 to 60/40, and among them 75/25 to 65/35 from the viewpoint of more preferably forming the continuous phase including the aliphatic polyester-based resin (A) as a main component, and the ribbon-like dispersed phase including the polyvinyl alcohol-based resin (B) as a main component.

In order for the present resin layer to have the resin phase-separated structure as described above, it is preferred that the ratio between the content (mass) of the aliphatic polyester-based resin (A) and the content (mass) of the polyvinyl alcohol-based resin (B) is adjusted as described above, and that, for example, when the present molded article is injection-molded, the difference in melt viscosity is increased, or the resin (A) and the resin (B) are dry-blended and injection-molded, or the molded article is formed before both resins are compatibilized. When sheet molding is performed and then stretching is performed, the temperature in stretching, and the like is preferably adjusted. However, this method is not limiting.
[Aliphatic Polyester-Based Resin (A)]

The aliphatic polyester-based resin (A) is preferably an aliphatic polyester-based resin having an aliphatic structure moiety content of 50 mol % or more from the viewpoint of having biodegradability.

Examples of such an aliphatic polyester-based resin can include polyhydroxycarboxylic acids, polyesters having an aliphatic polyhydric alcohol and an aliphatic polybasic acid as main structural units, mixtures of polyhydroxycarboxylic acids and polyesters, and random copolymers and block copolymers including the components of hydroxycarboxylic acid-aliphatic polyhydric alcohol-aliphatic polybasic acid. Especially, polylactic acid, polyethylene succinate, polybutylene succinate, and polycaproic acid are preferably used in terms of compatibility with PVA, the mechanical properties of the obtained molded material, and the like, and particularly polylactic acid is preferred.

Here, as the hydroxycarboxylic acid, the aliphatic polyhydric alcohol, and the aliphatic polybasic acid, known ones can be used.

Examples of the hydroxycarboxylic acid can include glycolic acid, lactic acid, and 3-hydroxybutyric acid.

In addition, examples of the aliphatic polyhydric alcohol can include ethylene glycol, diethylene glycol, triethylene glycol, polyethylene glycol, propylene glycol, dipropylene glycol, 1,3-butanediol, and 1,4-butanediol.

Further, examples of the aliphatic polybasic acid can include succinic acid, oxalic acid, malonic acid, glutaric acid, adipic acid, and sebacic acid.

One or two or more of these can be used.

[Polyvinyl Alcohol-Based Resin (B)]

The polyvinyl alcohol-based resin (PVA-based resin) (B) used in the present invention is a resin mainly including a vinyl alcohol structural unit, obtained by saponifying a polyvinyl ester-based resin obtained by polymerizing a vinyl ester-based monomer, and includes a vinyl alcohol structural unit corresponding to the degree of saponification, and a vinyl ester structural unit remaining without being saponified.

Examples of the vinyl ester-based monomer can include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, but economically, vinyl acetate is preferably used.

The average degree of polymerization of the PVA-based resin used in the present invention (measured in accordance with JIS K6726) is preferably 150 to 3000 and further preferably, especially 200 or more or 2000 or less, and among them 300 or more or 1000 or less, and among them 350 or more or 800 or less.

When such an average degree of polymerization is too low, the melt viscosity is too low, and the PVA-based resin tends to be emitted to the outside of the reaction system. Conversely, when such an average degree of polymerization is too high, the melt viscosity is too high, and the PVA-based resin tends to thermally decompose due to shear heat generation.

The average degree of polymerization of the PVA-based resin is calculated herein from the viscosity of a 4% by mass aqueous solution at 20° C. measured in accordance with JIS K 6726.

When as the PVA-based resin, one having a pellet shape is used, its mass average molecular weight is preferably 200 or more and 1200 or less and further preferably, especially 300 or more or 800 or less.

The degree of saponification of the PVA-based resin used in the present invention is preferably 70 to 100 mol t and further preferably, especially 80 mol e or more or 99.9 mol % or less, and among them 90 mol e or more or 99.8 mol % or less, and among them 96 mol or more or 99.8 mol % or less.

When the degree of saponification is too low, the compatibility between the aliphatic polyester-based resin (A) and the PVA-based resin (B) improves, and the PVA-based resin (B) finely disperses in the aliphatic polyester-based resin (A), and the decomposition and viscosity reduction of the resins tend to occur easily.

When the particle diameter of the dispersed PVA-based resin (B) is small, the size of the formed barrier layers is small in injection molding, and the gas barrier properties of the molded article also tends to decrease.

The degree of saponification is measured in accordance with JIS K 6726.

In the case of an ordinary PVA-based resin, for the bonding form of the main chain, 1,3-diol bonds are predominant, and the content of 1,2-diol bonds is about 1.5 to 1.7 mol %. But the content can be increased by setting high the polymerization temperature when the vinyl ester-based monomer is polymerized, and a PVA-based resin having a 1,2-diol bond content of 1.8 mol or more, further 2.0 to 3.5 mol %, can be obtained.

The PVA-based resin may be modified polyvinyl alcohol.

Here, the "modified polyvinyl alcohol" is polyvinyl alcohol having a vinyl alcohol structural unit, a vinyl ester structural unit, and a structural unit other than these.

In the present invention, as the PVA-based resin, those obtained by copolymerizing various unsaturated monomers with vinyl ester-based monomers during the production of vinyl ester-based resins and saponifying the copolymers, and various modified PVA-based resins obtained by introducing various functional groups into PVA-based resins by post-modification can be used. Such modification can be performed in a range in which the water-solubility of the PVA-based resin is not lost.

Examples of the unsaturated monomers used for copolymerization with the vinyl ester-based monomers can include olefins such as ethylene, propylene, isobutylene, α-octene, α-dodecene, and α-octadecene, unsaturated acids such as acrylic acid, methacrylic acid, crotonic acid, maleic acid, maleic anhydride, and itaconic acid, or salts, mono- or dialkyl esters, or the like thereof, nitriles such as acrylonitrile and methacrylonitrile, amides such as acrylamide and methacrylamide, olefinsulfonic acids such as ethylenesulfonic acid, allylsulfonic acid, and methallylsulfonic acid, or salts thereof, alkyl vinyl ethers, N-acrylamidomethyltrimethylammonium chloride, allyltrimethylammonium chloride, dimethylallyl vinyl ketone, N-vinylpyrrolidone, vinyl chloride, vinylidene chloride, polyoxyalkylene (meth)allyl ethers such as polyoxyethylene (meth)allyl ether and polyoxypropylene (meth)allyl ether, polyoxyalkylene (meth)acrylates such as polyoxyethylene (meth)acrylate and polyoxypropylene (meth)acrylate, polyoxyalkylene (meth)acrylamides such as polyoxyethylene (meth)acrylamide and polyoxypropylene (meth)acrylamide, polyoxyethylene (1-(meth)acrylamido-1,1-dimethylpropyl) ester, polyoxyethylene vinyl ether, polyoxypropylene vinyl ether, polyoxyethylene allylamine, polyoxypropylene allylamine, polyoxyethylene vinylamine, polyoxypropylene vinylamine, and hydroxy group-containing α-olefins such as 3-buten-1-ol, 4-penten-1-ol, and 5-hexen-1-ol, and derivatives such as acylated products thereof.

Examples of PVA-based resins into which functional groups are introduced by post-reaction can include those having an acetoacetyl group by reaction with diketene, those having a polyalkylene oxide group by reaction with ethylene oxide, those having a hydroxyalkyl group by reaction with an epoxy compound or the like, or those obtained by reacting aldehyde compounds having various functional groups with PVA-based resins.

The amount of modification in such modified PVA-based resins, that is, the content of the constituent units derived from the various unsaturated monomers in the copolymers, or the functional groups introduced by post-reaction, is preferably 0.1 to 20 mol % and further preferably, especially 0.5 mol % or more or 10 mol % or less though it depends because the characteristics differ greatly depending on the modifying species.

Among these various modified PVA-based resins, in the present invention, PVA-based resins having a primary hydroxyl group in the side chain, and ethylene-modified PVA-based resins are preferred, and in terms of gas barrier properties, PVA-based resins having a 1,2-diol structure in the side chain, PVA-based resins having a primary hydroxyl group in the side chain, such as PVA-based resins having a hydroxylmethyl group, and ethylene-modified PVA-based resins are preferred, particularly, PVA-based resins having a 1,2-diol structure in the side chain, and ethylene-modified PVA-based resins are preferred, and ethylene-modified PVA-based resins are most preferred.

In addition, particularly PVA-based resins having a structural unit having a 1,2-diol structure in the side chain represented by the following general formula (1) are preferred in terms of water solubility and melting and molding properties, and in general formula (1), $R^1$, $R^2$, and $R^3$ each independently represent a hydrogen atom or an alkyl group having 1 to 4 carbon atoms, X represents a single bond or a bond chain, and $R^4$, $R^5$, and $R^6$ each independently represent a hydrogen atom or an alkyl group having 1 to 4 carbon atoms.

[Formula 1]

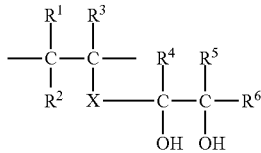

(1)

wherein $R^1$, $R^2$, and $R^3$ each independently represent a hydrogen atom or an alkyl group having 1 to 4 carbon atoms, X represents a single bond or a bond chain, and $R^4$, $R^5$, and $R^6$ each independently represent a hydrogen atom or an alkyl group having 1 to 4 carbon atoms.

The content of the 1,2-diol structural unit represented by general formula (1) (modification rate) in such a PVA-based resin having a 1,2-diol structure in the side chain is preferably 0.1 to 20 mol % and further preferably, especially 0.3 mol % or more or 15 mol % or less, and among them 0.5 mol % or more or 12 mol % or less, and among them 1 mol % or more or 8 mol % or less. When such a modification rate is too low, melting and molding tends to be difficult. When such a modification rate is too high, the hydrophilicity is too high, and the compatibility with aliphatic polyesters and the like tends to decrease.

The portions other than the 1,2-diol structural unit are a vinyl alcohol structural unit, and a vinyl ester structural unit in an unsaponified portion, as in an ordinary PVA-based resin.

When $R^1$ to $R^3$, and $R^4$ to $R^6$ in the 1,2-diol structural unit represented by general formula (1) are all hydrogen atoms, a primary hydroxyl group is at the end of the side chain, which is desirable in terms of solubility in water. However, the hydrogen atoms may be replaced by alkyl groups having 1 to 4 carbon atoms in such an amount that the resin characteristics are not significantly impaired.

The alkyl group having 1 to 4 carbon atoms is, for example, a methyl group, an ethyl group, a n-propyl group, an isopropyl group, a n-butyl group, an isobutyl group, or a tert-butyl group, and may have a substituent such as a halogen group, a hydroxyl group, an ester group, a carboxylic acid group, or a sulfonic acid group, as needed.

X in the 1,2-diol structural unit represented by general formula (1) is most preferably a single bond in terms of thermal stability and in terms of stability at high temperature and under acidic conditions. X may be a bond chain in a range that does not inhibit the effects of the present invention.

Examples of such a bond chain can include, in addition to hydrocarbons such as alkylenes, alkenylenes, alkynylenes, phenylene, and naphthylene (these hydrocarbons may be substituted by a halogen such as fluorine, chlorine, or bromine, or the like), —O—, —(CH$_2$O)m—, —(OCH$_2$)m—, —(CH$_2$O)mCH$_2$—, —CO—, —COCO—, —CO(CH$_2$)mCO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O— (R is each independently any substituent and preferably a hydrogen atom or an alkyl group, and m is an integer of 1 to 5). Especially, in terms of stability during production or during use, alkylene groups having 6 or less carbon atoms, particularly a methylene group or —CH$_2$OCH$_2$— is preferred.

The method for producing such a PVA-based resin having a 1,2-diol structure in the side chain is not particularly limited. For example, (i) a method of saponifying a copolymer of a vinyl ester-based monomer and a compound represented by the following general formula (2), (ii) a method of saponifying and decarboxylating a copolymer of a vinyl ester-based monomer and a compound represented by the following general formula (3), and (iii) a method of saponifying and deketalizing a copolymer of a vinyl ester-based monomer and a compound represented by the following general formula (4) can be preferably used. For example, such a PVA-based resin can be produced by the method described in the paragraphs [0021] to [0035] of Japanese Patent Laid-Open No. 2015-120827.

[Formula 2]

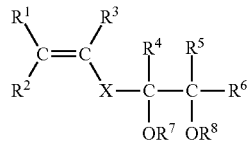

(2)

[Formula 3]

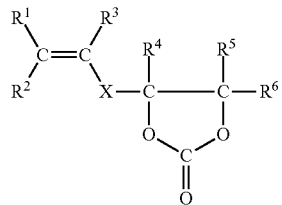

(3)

[Formula 4]

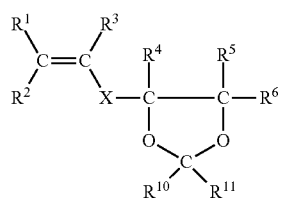

(4)

All of $R^1$, $R^2$, $R^3$, X, $R^4$, $R^5$, and $R^6$ in the general formulas (2), (3), and (4) are the same as in the case of general formula (1). $R^7$ and $R^8$ are each independently a hydrogen atom or $R^9$—CO— wherein $R_9$ is an alkyl group having 1 to 4 carbon atoms.

$R^{10}$ and $R^{11}$ are each independently a hydrogen atom or an alkyl group having 1 to 4 carbon atoms.

The PVA-based resin used in the present invention may be one type or a mixture of two or more types, and in the case, combinations of the above-described unmodified PVAs, the above-described unmodified PVA, modified PVA-based resin, and PVA-based resins in which the degree of saponification, the degree of polymerization, and the degree of modification, and the like are different, and the like can be used.

[Relationship between Aliphatic Polyester-Based Resin (A) and Polyvinyl Alcohol-Based Resin (B)]

(Melt Viscosity)

The absolute value of the difference between the melt viscosity of the aliphatic polyester-based resin (A) at 210° C. and a shear rate of 1216 sec$^{-1}$ (ηA) and the melt viscosity of the polyvinyl alcohol-based resin (B) at 210° C. and a shear rate of 1216 sec-1 (ηB) (|ηA-ηB|) is preferably 100 Pa·s or more. Especially, from the viewpoint of gas barrier properties and molding stability, preferably, the absolute value is further preferably 100 Pa·s or more or 600 Pa·s or less and further preferably, especially 150 Pa·s or more or 550 Pa·s or less, and among them 200 Pa·s or more or 500 Pas or less, and particularly among them 200 Pa·s or more or 400 Pa·s or less. When such a viscosity difference is too small, the volume of the island portions (ribbon-like dispersed phase) of the sea-island structure (resin phase-separated structure) is too small, and the size of the barrier layers formed in injection molding is small, and the gas barrier properties tend to decrease. When such a viscosity difference is too large, the low viscosity resin is emitted to the outside of the reaction system, and the gas barrier properties tend to decrease.

The melt viscosity of the aliphatic polyester-based resin (A) at 210° C. and a shear rate of 1216 sec$^{-1}$ is preferably 150 to 500 Pa·s, more preferably 160 Pa·s or more or 200 Pa·s or less, and further preferably 170 Pa·s or more or 185 Pa·s or less.

On the other hand, the melt viscosity of the polyvinyl alcohol-based resin (B) at 210° C. and a shear rate of 1216 sec$^{-1}$ is preferably 250 to 800 Pa·s, more preferably 300 Pa·s or more or 600 Pa·s or less, and further preferably 330 Pa·s or more or 550 Pa·s or less.

[Other Resins]

The present resin layer may contain any one or two or more of resins other than the above, for example, synthetic resins such as polyhydroxyalkanoates, polycarbonates, polyamides, polystyrene, polyolefins, acrylic resins, amorphous polyolefins, ABS, AS (acrylonitrile styrene), polycaprolactone, and cellulose esters, as needed.

However, the content of these "resins other than the above" is preferably less than 50 parts by mass, particularly less than 30 parts by mass, and particularly less than 10 parts by mass based on 100 parts by mass of the main component resins.

[Other Components]

The present resin layer may include, for example, various additives such as inorganic particles, a lubricant, a plasticizer, an antistatic agent, an antioxidant, a light stabilizer, an ultraviolet absorbing agent, a dye, a pigment, a hydrolysis inhibitor, a crystal nucleating agent, an antiblocking agent, a light-resistant agent, a heat stabilizer, a flame retardant, a release agent, an antifogging agent, a surface wetting improving agent, a burning aid, a dispersion aid, various surfactants, and a slip agent, starch, cellulose, paper, animal/plant substance fine powders such as a wood powder, chitin-chitosan, a coconut shell powder, and a walnut shell powder, or a mixture thereof, as "other components", as needed. These can be optionally combined in a range that does not impair the effects of the present invention, and one may be used singly, or two or more may be mixed and used.

The content of these "other components" is not particularly limited. As a guide, the content is preferably 0.01% by mass or more and 40% by mass or less based on the total amount of the layers.

(Inorganic Particles)

By containing inorganic particles, not only can the storage modulus be enhanced, but the heat resistance can be enhanced. However, when the amount of the inorganic particles is too large, elongation is less likely to occur during molding.

From such a viewpoint, the content of the inorganic particles is preferably 10 parts by mass or more and further preferably, especially 20 parts by mass or more and among them 25 parts by mass or more based on 100 parts by mass of the total amount of the composition forming the present resin layer, for example, the total of the biodegradable resins and the inorganic particles, from the viewpoint of heat resistance. On the other hand, the content of the inorganic particles is preferably 60 parts by mass or less and further preferably, especially 50 parts by mass or less and among them 40 parts by mass or less based on 100 parts by mass of the total amount of the composition forming the present resin layer, for example, the total of the biodegradable resins and the inorganic particles, from the viewpoint of stretchability.

The type of the inorganic particles is not particularly limited. Examples thereof can include silica, isinglass, talc, mica, clay, titanium oxide, calcium carbonate, diatomaceous earth, allophane, bentonite, potassium titanate, zeolite, sepiolite, smectite, kaolin, kaolinite, glass, limestone, carbon, wollastonite, calcined perlite, silicates such as calcium silicate and sodium silicate, aluminum oxide, magnesium carbonate, hydroxides such as calcium hydroxide, ferric carbonate, zinc oxide, iron oxide, aluminum phosphate, and barium sulfate. One of these may be used singly, or two or more may be used together in any combination and ratio. Especially, from the viewpoint of improving the storage modulus and the transparency, talc is more preferred.

The particle diameter of the inorganic particles is not particularly limited. For reasons of handling, the average particle diameter is preferably 0.5 μm or more, more preferably 0.6 μm or more, further preferably 0.7 μm or more, and particularly preferably 1.0 μm or more. On the other hand, the average particle diameter of the inorganic particles is preferably 50 μm or less, more preferably 30 μm or less, and further preferably 20 μm or less.

Examples of the method for measuring the average particle diameter at this time can include a method in which the specific surface area value per g of the powder measured by a powder specific surface area measuring apparatus, model SS-100 (constant pressure type air transmission method), manufactured by SHIMADZU CORPORATION is obtained, and from the result of the measurement of the specific surface area by the air transmission method according to JIS M8511, the average particle diameter of the inorganic particles is calculated by the following formula:

average particle diameter (μm)=10000×{6/(specific gravity of inorganic particles×specific surface area)}

<Other Layers>

The present molded article may have a multilayer configuration of two or more layers including "another layer or other layers" other than the present resin layer, as described above.

Examples of "other layers" can include a water vapor barrier layer having water vapor barrier properties, a paper layer, and a printed layer.

(Water Vapor Barrier Layer)

Examples of the water vapor barrier layer can include the above aliphatic polyester-based resins, polyolefins, or inorganic vapor-deposited layers including polyolefins as base materials.

<Applications of Present Molded Article>

The present molded article is excellent in moldability, for example, injection moldability, and can have excellent gas barrier properties, and therefore it is possible to process into various molded articles including coffee capsules, that is, coffee bean containers for capsule type coffee makers, bottles, cups, trays, and seedling pots containing the present molded article as a main component, and use the various molded articles. In addition, the present molded article has biodegradability and therefore can be decomposed in natural environments such as in water and in soil after use.

The "main component" of a coffee capsule containing the present molded article as a main component means a component having the highest mass proportion among the components constituting the coffee capsule. Especially, the "main component" means that it accounts for 50% by mass or more, especially 70% by mass or more, especially 80% by mass or more, and especially 90% by mass or more (including 100% by mass) of the components constituting the coffee capsule.

<<Present Molded Article 1>>

Next, as one example of the present molded article, a molded article including a resin layer obtained by dry-blending and molding pellets (A1) including the aliphatic polyester-based resin (A) as a main component, and pellets (B1) including the polyvinyl alcohol-based resin (B) as a main component (referred to as "the present molded article 1") will be described.

[Pellets (A1) Including Aliphatic Polyester-Based Resin (A) as Main Component]

The pellets (A1) including the aliphatic polyester-based resin (A) as a main component contain the aliphatic polyester-based resin (A) in an amount of 50% by mass or more of the entire pellets (A1) and may contain the aliphatic polyester-based resin (A) in an amount of 70% by mass or more, especially 80, by mass or more, and especially 905 by mass or more (including 100% by mass).

The pellets (A1) may contain "another biodegradable thermoplastic resin" other than the aliphatic polyester-based resin (A) in a range that does not impair the effects of the present invention.

The another biodegradable thermoplastic resin includes polybutylene succinate (PBS) and polycaprolactone and is preferably PBS.

The content of another biodegradable thermoplastic resin is preferably less than 30% by mass and further preferably, especially 25% by mass or less and among them 15% by mass or less based on the entire pellets (A1). When the content of another biodegradable thermoplastic resin is too high, the film strength tends to decrease.

The pellets (A1) may further contain an antioxidant for the improvement of thermal stability, a lubricant for molding stability improvement, a plasticizer (particularly one that can be added as a food additive) for providing flexibility, and the like as other combined components.

The content of other combined components based on the entire pellets (A1) should be in a range that does not impair the effects of the present invention. Especially, from the viewpoint of bleedout, the content is preferably 10% by mass or less.

The pellets (A1) are obtained by melting and molding and obtained, for example, by kneading using a known kneading apparatus such as an extruder (single-screw or twin-screw), a Banbury mixer, a kneader-ruder, a mixing roll, or a blast mill, and molding. Especially, a twin-screw extruder excellent in kneadability is preferably used.

For the size of the pellets (A1), the diameter is preferably 0.5 mm to 10 mm and further preferably, especially 1 mm or more or 5 mm or less. The length is preferably 1 mm to 20 mm and further preferably, especially 2 mm or more or 10 mm or less. Whether such a size is too large or too small, the melting and molding stability tends to decrease.

In the present invention, a method of obtaining pellets by forming strands by a twin-screw extruder and cutting the strands by a pelletizer is particularly preferred.

[Pellets (B1) Including Polyvinyl Alcohol-Based Resin (B) as Main Component]

The pellets (B1) including the polyvinyl alcohol-based resin (PVA resin) (B) as a main component contain the PVA resin (B) in an amount of 50% by mass or more of the entire pellets (B1) and may contain the PVA resin (B) in an amount of 70% by mass or more, especially 80% by mass or more, and especially 90% by mass or more (including 100% by mass).

The pellets (B1) may contain "other combined components" other than the PVA-based resin (B) in a range that does not impair the effects of the present invention.

As other combined components, an antioxidant for the improvement of thermal stability, a lubricant for molding stability improvement, a plasticizer (particularly one that can be added as a food additive) for providing flexibility, and the like may be contained.

The content of other combined components based on the entire pellets (B1) should be in a range that does not impair the effects of the present invention. Especially, from the viewpoint of bleedout, the content is preferably 10% by mass or less.

The pellets (B1) are obtained by melting and molding and obtained, for example, by kneading using a known kneading apparatus such as an extruder (single-screw or twin-screw), a Banbury mixer, a kneader-ruder, a mixing roll, or a blast mill, and molding. Especially, a twin-screw extruder excellent in kneadability is preferably used.

For the size of the pellets (B1), the diameter is preferably 0.5 mm to 10 mm and further preferably, especially 1 mm or more or 5 mm or less. The length is preferably 1 mm to 10 mm and further preferably, especially 2 mm or more or 5 mm or less. Whether such a size is too large or too small, the melting and molding stability tends to decrease.

In the present invention, a method of obtaining pellets by forming strands by a twin-screw extruder and cutting the strands by a pelletizer is particularly preferred.

<Method for Producing Present Molded Article 1>

The present molded article 1 can be produced by dry-blending and molding the pellets (A1) including the aliphatic polyester-based resin (A) as a main component, and the pellets (B1) including the polyvinyl alcohol-based resin (B) as a main component.

(Present Molded Article 1A)

For example, the present molded article 1A as an injection-molded article can be obtained by combining predetermined amounts of the pellets (A1) including the aliphatic polyester-based resin (A) as a main component, and the pellets (B1) including the PVA-based resin (B) as a main component, dry-blending them, and injection-molding the dry blend. In other words, the present molded article 1A can be made by dry-blending the pellets (A1) and the pellets (B1) in a state of pellets without previously melting and kneading the pellets (A1) and the pellets (B1), and injection-molding the dry blend.

The absolute value of the difference between the melt viscosity of the pellets (A1) at 210° C. and a shear rate of 1216 sec$^{-1}$ ($\eta$A1) and the melt viscosity of the pellets (B1) at 210° C. and a shear rate of 1216 sec$^{-1}$ ($\eta$B1) (|$\eta$A1-$\eta$B1|) is preferably 100 Pa·s or more.

Especially, from the viewpoint of gas barrier properties and molding stability, preferably, the absolute value is further preferably 100 Pa·s or more or 600 Pa·s or less and further preferably, especially 150 Pa·s or more or 550 Pa·s or less, and among them 200 Pa·s or more or 500 Pa·s or less, and particularly among them 200 Pa·s or more or 400 Pa·s or less. When such a viscosity difference is too small, the volume of the island portions (ribbon-like dispersed phase) of the sea-island structure (resin phase-separated structure) is too small, and the size of the barrier layers formed in injection molding is small, and the gas barrier properties tend to decrease. When such a viscosity difference is too large, the low viscosity resin is emitted to the outside of the reaction system, and the gas barrier properties tend to decrease.

The viscosity difference during injection molding in the present invention is measured by the following method.

For the melt viscosity of the respective resins to be compared, the melt viscosity at 210° C. and a shear rate of 1216 sec$^{-1}$ is measured by CAPILOGRAPH manufactured by Toyo Seiki Seisaku-sho, Ltd.

The melt viscosity of the pellets (A1) at 210° C. and a shear rate of 1216 sec$^{-1}$ is preferably 150 to 500 Pa·s, more preferably 160 Pa·s or more or 200 Pa·s or less, and further preferably 170 Pa·s or more or 185 Pa·s or less.

The melt viscosity of the pellets (B1) at 210° C. and a shear rate of 1216 sec$^{-1}$ is preferably 250 to 800 Pa·s, more preferably 300 Pa·s or more or 600 Pa·s or less, and further preferably 330 Pa·s or more or 550 Pa·s or less.

The present molded article 1A as an injection-molded article is obtained by mixing and injection-molding the pellets (A1) and the pellets (B1). At this time, considering molding stability and gas barrier properties, the mass composition ratio between both, (A1)/(B1), is preferably 99/1 to 51/49, further preferably 95/5 to 55/45, particularly preferably 90/10 to 60/40, and most preferably 85/15 to 65/35.

When the mass composition ratio (A1)/(B1) is in the above range, the size of the island portions (ribbon-like dispersed phase) of the PVA-based resin (B) easily becomes large in the sea-island structure (resin phase-separated structure) of the aliphatic polyester-based resin (A) and the PVA-based resin (B) during injection molding, and larger gas barrier layers are formed in injection, and thus the effects of the invention of the present application are easily obtained.

The present molded article 1A as an injection-molded article may contain a known plasticizer such as glycerin, a derivative thereof, or polyethylene glycol, as needed. In addition, the present molded article 1A may contain other additives, for example, a heat stabilizer, an ultraviolet absorbing agent, a weathering stabilizer, an antioxidant, a colorant, a lubricant, a release agent, a perfume, and a filler, in a range in which the object of the present invention is not inhibited.

From the viewpoint of forming a resin phase-separated structure including a continuous phase and a ribbon-like dispersed phase, the conditions of injection molding are preferably as follows.

When the mold temperature is too low, a possibility that the resins solidify while being not yet molded occurs. When the mold temperature is too high, solidification takes time. Therefore, as a guide, the mold temperature is preferably 30 to 90° C. and further preferably, especially 40° C. or more or 70° C. or less and among them 50° C. or more or 60° C. or less.

Whether the injection speed is too fast or too slow, not only is there a possibility that defects in appearance, for example, jetting, flow marks, air patterns, weld lines, and gas burns, are caused, but there is a possibility that defects in function and shape, for example, warpage, and deformation due to an increase in residual stress, are caused, and further there is a possibility that the mass varies to cause instability. Thus, from such a viewpoint, the injection speed is preferably 50 to 300 mm/sec and further preferably, especially 100 mm/sec or more or 200 mm/sec or less.

When "other layers" other than the present resin layer are laminated in the present molded article 1A, other layers should be laminated by coating with resin compositions for forming other layers, or the like, after injection molding. However, this method is not limiting.

(Present Molded Article 1B)

For example, for the present molded article 1B as a sheet-molded article, the present molded article 1B can be produced by combining predetermined amounts of the pellets (A1) including the aliphatic polyester-based resin (A) as a main component, and the pellets (B1) including the PVA-based resin (B) as a main component, dry-blending them, sheet-molding the dry blend, then stretching the sheet obtained by the sheet molding in one axial direction or two axial directions, and subjecting the obtained sheet body to secondary molding processing. In other words, the present molded article 1B can be obtained by dry-blending the pellets (A1) and the pellets (B1) in a state of pellets without previously melting and kneading the pellets (A1) and the pellets (B1), sheet-molding the dry blend, then stretching the sheet obtained by the sheet molding in one axial direction or two axial directions, and subjecting the obtained sheet body to secondary molding processing.

Here, the "secondary molding processing" means processing in which the sheet is deformed into another shape, or another shape is provided. Examples of the processing method can include thermal molding methods such as vacuum molding and compressed air molding. However, these are not limiting.

From the viewpoint of forming a resin phase-separated structure including a continuous phase and a ribbon-like dispersed phase, the production conditions of the present molded article 1B are preferably as follows.

Regarding the method for producing the present molded article 1B, when the sheet molding temperature is too low, the resins do not soften, and a uniform molded article is difficult to obtain. When the sheet molding temperature is too high, there is a possibility that the resins decompose. Therefore, the sheet molding temperature is preferably 140 to 250° C. and preferably, especially 180° C. or more or 230° C. or less.

For the stretching, the sheet is more preferably stretched in two axial directions. At this time, when the stretching temperature is too low, the stretching is insufficient, and when the stretching temperature is too high, stretching unevenness occurs easily. Therefore, for the stretching temperature, the sheet temperature is preferably 60 to 100° C. and further preferably, especially 70° C. or more or 90° C. or less.

When the stretching ratio is too small, sufficient gas barrier properties tend not to be obtained. Conversely, when the stretching ratio is too large, breakage may occur during stretching. Therefore, the stretching ratio is preferably 2 to 100 times and further preferably, especially 4 times or more or 50 times or less and among them 6 times or more or 20 times or less, in terms of area ratio.

The sheet is preferably cooled after the stretching. At this time, when the cooling temperature is too low, crystallization does not proceed, and there is a possibility that the gas barrier properties decrease, and when the cooling temperature is too high, cooling takes time. Therefore, for the cooling temperature, the sheet temperature is preferably 20 to 60° C. and more preferably, especially 30° C. or more or 50° C. or less.

When "other layers" other than the present resin layer are laminated in the present molded article 1B, for example, the present resin layer and other layers may be coextruded and then stretched, or the present resin layer should be formed and then coated with resin compositions for forming other layers, for lamination, or the like. However, these methods are not limiting.

<Explanation of Words and Phrases>

In the present invention, "biodegradability" refers to the property of being finally decomposed into water and carbon dioxide by the action of microorganisms and is preferably the property of satisfying the fact that the amount of a film 100 mm square reaches within 10% as the residue on a 2 mm sieve in an aerobic compost environment at 58° C. on a pilot scale within 12 weeks described in ISO 16929 or JIS K6952.

In the present invention, "gas barrier properties" mean, in a broad sense, the property of suppressing the transmission of any gas and more restrictively mean the property of suppressing the transmission of oxygen.

In the present invention, the expression "X to Y" (X and Y are any numbers) encompasses the meaning "X or more and Y or less" and also the meaning "preferably larger than X" or "preferably smaller than Y" unless otherwise noted.

The expression "X or more" (X is any number) or "Y or less" (Y is any number) also encompasses the intention of "being preferably larger than X" or "being preferably less than Y."

EXAMPLES

The present invention will be more specifically described below by giving Examples, but the present invention is not limited to the following Examples unless departing from the spirit thereof.

"Parts" and "%" in the examples mean being based on mass.

Example 1

[Making of PVA-1]

Ten parts of vinyl acetate (10% of the whole was initially charged) and 45 parts of methanol were charged into a reaction can equipped with a reflux condenser, a dropping apparatus, and a stirrer, and while the mixture was stirred, the temperature was raised under a nitrogen gas flow. After the boiling point was reached, 0.05 parts of acetyl peroxide was introduced to initiate polymerization. Further, after 0.28 h from the initiation of the polymerization, 90 parts of vinyl acetate was dropped at a constant rate over 22 h. At the point in time when the polymerization rate of vinyl acetate reached 95%, a predetermined amount of hydroquinone monomethyl ether was added to terminate the polymerization. Then, distillation was performed, while methanol vapor was blown, to remove the unreacted vinyl acetate monomer out of the reaction system and obtain a methanol solution of a vinyl acetate polymer.

Then, the solution was diluted with methanol to adjust the solid concentration at 55%, and such a methanol solution was charged into a kneader. While the solution temperature was kept at 35° C., a 22 methanol solution of sodium in sodium hydroxide was added in the proportion of 6.3 mmol based on 1 mol of the vinyl acetate structural unit to perform saponification. As the saponification proceeded, a saponified product precipitated. At the point in time when the saponified product became particulate, further a 2% methanol solution of sodium in sodium hydroxide was added in an amount of 6.0 mmol based on 1 mol of the vinyl acetate structural unit to perform saponification. Subsequently, acetic acid for neutralization was added in an amount of 0.8 equivalents based on sodium hydroxide, and the mixture was filtered. The residue was washed well with methanol and dried in a hot air dryer to obtain PVA-1.

When the degree of saponification of the obtained PVA-1 was analyzed by the amount of the alkali consumed required for the hydrolysis of the remaining structural unit of vinyl acetate in the resin, it was 88 mol %. When analysis was performed according to JIS K6726, the average degree of polymerization was 500.

[Making of PVA-1 Pellets]

Seven parts of glycerin as a plasticizer was combined based on 100 parts of PVA-1 obtained above, and pellets were formed under the following conditions. When for the obtained pellets, the melt viscosity of the PVA-1 pellets at 210° C. and a shear rate of 1216 $sec^{-1}$ was measured by CAPILOGRAPH manufactured by Toyo Seiki Seisaku-sho, Ltd., the melt viscosity was 387 Pa·s.

extruder: 15 mm ⌀ L/D=60 manufactured by TECHNOVEL CORPORATION, number of revolutions: 200 rpm, amount of discharge: 1.5 to 2.0 kg/h extrusion temperature: C1/C2/C3/C4/C5/C6/C7/C8/D=90/170/190/200/205/210/210/210/210° C.

[Making of Injection-Molded Article]

A cup was produced by injection molding by an injection molding machine (manufactured by Toyo Machinery & Metal Co., Ltd., Si80-6) under the following conditions using 70 parts by mass of pellets of polylactic acid (PLA) ("Ingeo 3001D" manufactured by NatureWorks) as an aliphatic polyester-based resin (A) (melt viscosity at 210° C. and shear rate of 1216 sec-1:177 Pa·s) and 30 parts by mass of pellets of PVA-1 obtained above, as a PVA-based resin (B). The thickness of the obtained injection-molded article was 800 μm.

The absolute value of the difference between the melt viscosity of the pellets (A1) including the aliphatic polyester-based resin (A) as a main component ($\eta A1$) and the melt viscosity of the pellets (B1) including the polyvinyl alcohol-based resin (B) as a main component (B1) ($|\eta A1 - \eta B1|$) at 210° C. and a shear rate of 1216 $sec^{-1}$ was 210 Pa·s.

(Conditions of Injection Molding)

injection molding machine: manufactured by Toyo Machinery & Metal Co., Ltd., Si80-6 heater temperature: H1/H2/H3/H4/H5/under hopper=210/210/210/200/190/170/40° C.

[Average Length (L1) and Average Thickness (L2) of Ribbon-Like Dispersed Phase]

The present resin layer was cut in the thickness direction in one place in the present molded article, and at least 10 arbitrary ribbon-like dispersed phase portions were observed on the cut surface. The respective lengths and thicknesses were measured, and the averages were calculated to obtain the average length (L1) and average thickness (L2) of the ribbon-like dispersed phase.

The thickness was the average value obtained by dividing the ribbon-like dispersed phase into four equal parts in the length direction and measuring two intermediate points excluding both ends.

[Evaluation of Oxygen Transmission Rate (OTR)]

For the injection-molded article obtained above, the oxygen transmission rate was measured by an oxygen transmission rate measuring apparatus (OX-TRAN2/20, manufactured by MOCON, USA) under the conditions of 23° C. and 50% RH. The result is shown in Table 1.

Example 2

[Making of PVA-2]

Ten parts of vinyl acetate (10% of the whole was initially charged), 45 parts of methanol, and 0.20 parts of 3,4-diacetoxy-1-butene (10% of the whole was initially charged) were charged into a reaction can equipped with a reflux condenser, a dropping apparatus, and a stirrer, and while the mixture was stirred, the temperature was raised under a nitrogen gas flow. After the boiling point was reached, 0.1 parts of acetyl peroxide was introduced to initiate polymerization. Further, after 0.5 h from the initiation of the polymerization, 90 parts of vinyl acetate and 8.2 parts of 3,4-diacetoxy-1-butene were dropped at a constant rate over 22.5 h. At the point in time when the polymerization rate of vinyl acetate reached 95%, a predetermined amount of hydroquinone monomethyl ether was added to terminate the polymerization. Then, distillation was performed, while methanol vapor was blown, to remove the unreacted vinyl acetate monomer out of the system and obtain a methanol solution of a copolymer.

Then, the solution was diluted with methanol to adjust the solid concentration at 55%, and such a methanol solution was charged into a kneader. While the solution temperature was kept at 35° C., a 2% methanol solution of sodium in sodium hydroxide was added in the proportion of 6.3 mmol based on 1 mol of the total amount of the vinyl acetate structural unit and the 3,4-diacetoxy-1-butene structural unit in the copolymer to perform saponification. As the saponification proceeded, a saponified product precipitated. At the point in time when the saponified product became particulate, further a 2% methanol solution of sodium in sodium hydroxide was added in an amount of 6.0 mmol based on 1 mol of the total amount of the vinyl acetate structural unit and the 3,4-diacetoxy-1-butene structural unit to perform saponification. Subsequently, acetic acid for neutralization was added in an amount of 0.8 equivalents based on sodium hydroxide, and the mixture was filtered. The residue was washed well with methanol and dried in a hot air dryer to obtain PVA-2 having a 1,2-diol structure in the side chain.

When the degree of saponification of the obtained PVA-2 having a 1,2-diol structure in the side chain was analyzed by the amount of the alkali consumed required for the hydrolysis of the remaining structural units of vinyl acetate and 3,4-diacetoxy-1-butene in the resin, it was 99 mol %. When analysis was performed according to JIS K6726, the average degree of polymerization was 450. When the content of the 1,2-diol structural unit represented by the formula (1) was calculated from the integral values measured by 1H-NMR (300 MHz proton NMR, d6-DMSO solution, internal standard substance; tetramethylsilane, 50° C.), it was 6 mol %.

[Making of PVA-2 Pellets]

PVA-2 obtained above was formed into pellets under the following conditions. When for the obtained pellets, the melt viscosity of the PVA-2 pellets at 210° C. and a shear rate of 1216 sec$^{-1}$ was measured by CAPILOGRAPH manufactured by Toyo Seiki Seisaku-sho, Ltd., the melt viscosity was 510 Pa·s.

extruder: 15 mm ¢ L/D=60 manufactured by TECHNOVEL CORPORATION number of revolutions: 200 rpm, amount of discharge: 1.2 to 1.5 kg/h extrusion temperature: C1/C2/C3/C4/C5/C6/C7/C8/D=90/170/190/200/205/210/210/210/210° C.

Evaluation was performed as in Example 1 except that pellets of PVA-1 was changed to pellets of PVA-2. The results are shown in Table 1.

The absolute value of the difference between the melt viscosity of the pellets (A1) including the aliphatic polyester-based resin (A) as a main component ($\eta$A1) and the melt viscosity of the pellets (B1) including the polyvinyl alcohol-based resin (B) as a main component (B1) (|$\eta$A1-$\eta$B1|) at 210° C. and a shear rate of 1216 sec$^{-1}$ was 333 Pa·s.

EXAMPLE 3

The same evaluation as in Example 1 was performed except that in Example 2, PVA-2 was changed to pellets of PVA-3 (PVA having a 1,2-diol structure in the side chain, degree of saponification: 88 mol %, average degree of polymerization: 450, content of 1,2-diol structure: 6 mol %) (melt viscosity at 210° C. and shear rate of 1216 sec-1:460 Pa·s).

The absolute value of the difference between the melt viscosity of the pellets (A1) including the aliphatic polyester-based resin (A) as a main component ($\eta$A1) and the melt viscosity of the pellets (B1) including the polyvinyl alcohol-based resin (B) as a main component (B1) (|$\eta$A1-$\eta$B1|) at 210° C. and a shear rate of 1216 sec$^{-1}$ was 283 Pa·s.

EXAMPLE 4

The same evaluation as in Example 1 was performed except that in Example 1, PVA-1 was changed to pellets of PVA-4 (ethylene-modified PVA, degree of saponification: 99 mol %, average degree of polymerization: 500, amount of ethylene modification: 8 mol %) (melt viscosity at 210° C. and shear rate of 1216 sec$^{-1}$:452 Pa·s).

The absolute value of the difference between the melt viscosity of the pellets (A1) including the aliphatic polyester-based resin (A) as a main component ($\eta$A1) and the melt viscosity of the pellets (B1) including the polyvinyl alcohol-based resin (B) as a main component ($\eta$B1) (|$\eta$A1-$\eta$B1|) at 210° C. and a shear rate of 1216 sec$^{-1}$ was 275 Pa·s.

COMPARATIVE EXAMPLE 1

The same evaluation as in Example 1 was performed except that in Example 1, PVA-2 was changed to pellets of PVA-5 (unmodified PVA, degree of saponification: 99 mol %, average degree of polymerization: 350) (melt viscosity at 210° C. and shear rate of 1216 sec-1:227 Pa·s). The results are shown in Table 1.

The absolute value of the difference between the melt viscosity of the pellets (A1) including the aliphatic polyester-based resin (A) as a main component (A1) and the melt viscosity of the pellets (B1) including the polyvinyl alcohol-based resin (B) as a main component (B1) ($|\eta A1-\eta B1|$) at 210° C. and a shear rate of 1216 sec$^{-1}$ was 50 Pa·s.

Comparative Example 2

In Example 1, pellets of polylactic acid (PLA) ("Ingeo 3001D" manufactured by NatureWorks) and pellets of PVA-1 were previously melted and kneaded before being subjected to injection molding, pellets containing polylactic acid and PVA-1 were obtained under the following conditions, injection molding was further performed under the following conditions using the pellets, to obtain an injection-molded article, and the same evaluation as in Example 1 was performed. The results are shown in Table 1.

The absolute value of the difference between the melt viscosity of the pellets (A1) including the aliphatic polyester-based resin (A) as a main component ($\eta A1$) and the melt viscosity of the pellets (B1) including the polyvinyl alcohol-based resin (B) as a main component ($\eta B1$) ($|\eta A1-\eta B1|$) at 210° C. and a shear rate of 1216 sec$^{-1}$ was the same as in Example 1.

(Conditions of Making Pellets)
  extruder: manufactured by TECHNOVEL CORPORATION, 15 mm φ, L/D=60
  number of revolutions: 200 rpm
  amount of discharge: 1.2 to 1.5 kg/h
  extrusion temperature: C1/C2/C3/C4/C5/C6/C7/C8/D=90/170/190/200/205/210/210/210/210° C.
(Conditions of Injection Molding)
  injection molding machine: manufactured by Toyo Machinery & Metal Co., Ltd., Si80-6
  heater temperature: H1/H2/H3/H4/H5/under hopper=210/210/200/190/170/40° C.

Comparative Example 3

In Example 2, pellets of polylactic acid (PLA) ("Ingeo 3001D" manufactured by NatureWorks) and pellets of PVA-2 were previously melted and kneaded before being subjected to injection molding, pellets containing polylactic acid and PVA-2 were obtained under the following conditions, injection molding was further performed under the following conditions using the pellets, to obtain an injection-molded article, and the same evaluation as in Example 1 was performed. The results are shown in Table 1.

The absolute value of the difference between the melt viscosity of the pellets (A1) including the aliphatic polyester-based resin (A) as a main component ($\eta A1$) and the melt viscosity of the pellets (B1) including the polyvinyl alcohol-based resin (B) as a main component ($\eta B1$) ($|\eta A1-\eta B1|$) at 210° C. and a shear rate of 1216 sec$^{-1}$ was the same as in Example 2.

(Conditions of Making Pellets)
  extruder: manufactured by TECHNOVEL CORPORATION, 15 mm φ, L/D=60
  number of revolutions: 200 rpm, amount of discharge: 1.2 to 1.5 kg/h
  extrusion temperature: C1/C2/C3/C4/C5/C6/C7/C8/D=90/170/190/200/205/210/210/210/210° C.

(Conditions of Injection Molding)
  injection molding machine: manufactured by Toyo Machinery & Metal Co., Ltd., Si80-6
  heater temperature: H1/H2/H3/H4/H5/under hopper=210/210/200/190/170/40° C.

Comparative Example 4

In Example 3, pellets of polylactic acid (PLA) ("Ingeo 3001D" manufactured by NatureWorks) and pellets of PVA-3 were previously melted and kneaded before being subjected to injection molding, pellets containing polylactic acid and PVA-3 were obtained under the following conditions, injection molding was further performed under the following conditions using the pellets, to obtain an injection-molded article, and the same evaluation as in Example 1 was performed. The results are shown in Table 1.

The absolute value of the difference between the melt viscosity of the pellets (A1) including the aliphatic polyester-based resin (A) as a main component ($\eta A1$) and the melt viscosity of the pellets (B1) including the polyvinyl alcohol-based resin (B) as a main component ($\eta B1$) ($|\eta A1-\eta B1|$) at 210° C. and a shear rate of 1216 sec-1 was the same as in Example 3.

(Conditions of Making Pellets)
  extruder: manufactured by TECHNOVEL CORPORATION, 15 mm φ, L/D=60
  number of revolutions: 200 rpm
  amount of discharge: 1.2 to 1.5 kg/h
  extrusion temperature: C1/C2/C3/C4/C5/C6/C7/C8/D=90/170/190/200/205/210/210/210/210° C.
(Conditions of Injection Molding)
  injection molding machine: manufactured by Toyo Machinery & Metal Co., Ltd., Si80-6
  heater temperature: H1/H2/H3/H4/H5/under hopper=210/210/200/190/170/40° C.

Comparative Example 5

In Example 4, pellets of polylactic acid (PLA) ("Ingeo 3001D" manufactured by NatureWorks) and pellets of EVOH (MFR 3.8 g/10 min (210° C., 2160 g)) were previously melted and kneaded before being subjected to injection molding, pellets containing polylactic acid and EVOH were obtained under the following conditions, injection molding was further performed under the following conditions using the pellets, to obtain an injection-molded article, and the same evaluation as in Example 1 was performed. The results are shown in Table 1.

The absolute value of the difference between the melt viscosity of the pellets (A1) including the aliphatic polyester-based resin (A) as a main component ($\eta A1$) and the melt viscosity of the pellets (B1) including the polyvinyl alcohol-based resin (B) as a main component ($\eta B1$) ($|\eta A1-\eta B1|$) at 210° C. and a shear rate of 1216 sec$^{-1}$ was the same as in Example 4.

(Conditions of Making Pellets)
  extruder: manufactured by TECHNOVEL CORPORATION 15 mm φ L/D=60
  number of revolutions: 200 rpm
  amount of discharge: 1.2 to 1.5 kg/h
  extrusion temperature: C1/C2/C3/C4/C5/C6/C7/C8/D=90/170/190/200/205/210/210/210/210° C.
(Conditions of Injection Molding)
  injection molding machine: manufactured by Toyo Machinery & Metal Co., Ltd., Si80-6 heater temperature: H1/H2/H3/H4/H5/under hopper=210/210/210/200/190/170/40° C.

Reference Example 1

Injection molding was performed under the following conditions without using the pellets (B1) including the PVA-based resin (B) as a main component and with only polylactic acid pellets, to obtain an injection-molded article, and the same evaluation as in Example 1 was performed. The results are shown in Table 1.

The absolute value of the difference between the melt viscosity of the pellets (A1) including the aliphatic polyester-based resin (A) as a main component ($\eta A1$) and the melt viscosity of the pellets (B1) including the polyvinyl alcohol-based resin (B) as a main component ($\eta B1$) (|$\eta A1-\eta B1$|) at 210° C. and a shear rate of 1216 sec$^{-1}$ was defined as 0 because only polylactic acid was used.
(Conditions of Injection Molding)
 injection molding machine: manufactured by Toyo Machinery & Metal Co., Ltd., Si80-6
 heater temperature: H1/H2/H3/H4/H5/under hopper=210/210/200/190/170/40° C.

component during injection molding in this manner, and thus an injection-molded article excellent in gas barrier properties can be obtained.

INDUSTRIAL APPLICABILITY

The molded article of the present invention has high gas barrier properties and has biodegradability. The molded article of the present invention has high gas barrier properties and therefore also has low aroma transmission properties and is useful as coffee capsules and various packaging materials for food and drugs in which aroma retention properties are regarded as important.

The invention claimed is:

1. A molded container comprising a resin layer containing an aliphatic polyester-based resin (A) and a polyvinyl alcohol-based resin (B) as main component resins,
  wherein the resin layer has a resin phase-separated structure having a continuous phase comprising the aliphatic polyester-based resin (A) as a main component, and a ribbon-like dispersed phase comprising the polyvinyl alcohol-based resin (B) as a main component,

TABLE 1

|  | PVA-based resin | | | | Average length (L1) (μm) | Average thickness (L2) (μm) | Ratio (L1, L2) | OTR (cc/pkg · day · air) |
| --- | --- | --- | --- | --- | --- | --- | --- | --- |
|  | Average degree of polymerization | Degree of saponification | Modifying species | Amount of modification |  |  |  |  |
| Example 1 | 500 | 88 | Unmodified | 0 | 8.9 | 0.5 | 19 | 0.02 |
| Example 2 | 450 | 99 | 1,2-Diol | 6 | 36.3 | 2.8 | 13 | 0.01 |
| Example 3 | 450 | 88 | 1,2-Diol | 6 | 16.8 | 1.7 | 10 | 0.02 |
| Example 4 | 500 | 99 | Ethylene | 8 | 32.9 | 1.2 | 28 | 0.005 |
| Comparative Example 1 | 350 | 99 | Unmodified | 0 | — | — | — | Impossible to measure |
| Comparative Example 2 | 500 | 88 | Unmodified | 0 | 1.6 | 1 | 2 | 0.06 |
| Comparative Example 3 | 450 | 99 | 1,2-Diol | 6 | 0.6 | 0.6 | 1 | 0.04 |
| Comparative Example 4 | 450 | 88 | 1,2-Diol | 6 | 0.8 | 1.1 | 1 | 0.06 |
| Comparative Example 5 | MFR 3.8 g/10 min | 99 | EVOH | 29 | 3.9 | 1.2 | 3 | 0.1 |

The molded articles of the present invention had a low oxygen transmission rate and were excellent in gas barrier properties. On the other hand, in Comparative Example 1 in which the viscosity difference between the resins used was small, the decomposition and viscosity reduction of the resins during injection molding were intense, resin biting defects occurred in the injection molding machine, and an abnormality occurred in the shape of the obtained injection-molded article, and therefore the oxygen transmission rate of the injection-molded article could not be measured.

The reason why the effect as described above is obtained is presumed to be as follows.

By performing injection molding using the pellets (A1) including the aliphatic polyester-based resin (A) as a main component and the pellets (B1) including the PVA-based resin (B) as a main component in which the viscosity difference during discharge in injection molding is a particular value or more, the PVA-based resin (B) is elongated and layered. It is presumed that many layers of the PVA-based resin (B) having gas barrier properties are formed inside the aliphatic polyester-based resin (A) of the sea wherein the aliphatic polyester-based resin (A) and the polyvinyl alcohol-based resin (B) form a sea-island structure, with the polyvinyl alcohol-based resin (B) serving as an island portion and forming the ribbon-like dispersed phase, and
wherein the ribbon-like dispersed phase has an average length (L1) of 6 μm or more and 100 μm or less, an average thickness (L2) of 0.1 μm or more and 5 μm or less, and a ratio of the average length (L1) to the average thickness (L2) (L1/L2) of 5 or more and 100 or less.

2. The molded container according to claim 1, wherein a ratio between a content (mass) of the aliphatic polyester-based resin (A) and a content (mass) of the polyvinyl alcohol-based resin (B) in the resin layer is aliphatic polyester-based resin (A)/polyvinyl alcohol-based resin (B)=99/1 to 51/49.

3. The molded container according to claim 1, wherein the aliphatic polyester-based resin (A) is an aliphatic polyester-based resin having an aliphatic structure moiety content of 50 mol % or more.

4. The molded container according to claim 1, wherein the aliphatic polyester-based resin (A) is polylactic acid.

5. The molded container according to claim 1, wherein the polyvinyl alcohol-based resin (B) is modified polyvinyl alcohol.

6. A molded container comprising a resin layer obtained by dry-blending and molding pellets (A1) comprising an aliphatic polyester-based resin (A) as a main component, and pellets (B1) comprising a polyvinyl alcohol-based resin (B) as a main component, wherein an absolute value of a difference between a melt viscosity of the aliphatic polyester-based resin (A) at 210° C. ($\eta A$) and a melt viscosity of the polyvinyl alcohol-based resin (B) at 210° C. ($\eta B$) ($|\eta A - \eta B|$) is 100 Pa's or more, wherein the aliphatic polyester-based resin (A) and the polyvinyl alcohol-based resin (B) form a sea-island structure, with the polyvinyl alcohol-based resin (B) serving as an island portion and forming a ribbon-like dispersed phase, and wherein the ribbon-like dispersed phase has an average length (L1) of 6 μm or more and 100 μm or less, an average thickness (L2) of 0.1 μm or more and 5 μm or less, and a ratio of the average length (L1) to the average thickness (L2) (L1/L2) of 5 or more and 100 or less.

7. The molded container according to claim 6, being an injection-molded container.

8. The molded container according to claim 6, wherein a ratio between a content (mass) of the aliphatic polyester-based resin (A) and a content (mass) of the polyvinyl alcohol-based resin (B) in the resin layer is aliphatic polyester-based resin (A)/polyvinyl alcohol-based resin (B)=99/1 to 51/49.

9. The molded container according to claim 6, wherein the aliphatic polyester-based resin (A) is an aliphatic polyester-based resin having an aliphatic structure moiety content of 50 mol % or more.

10. The molded container according to claim 6, wherein the aliphatic polyester-based resin (A) is polylactic acid.

11. The molded container according to claim 6, wherein the polyvinyl alcohol-based resin (B) is modified polyvinyl alcohol.

12. A coffee capsule comprising the molded container according to claim 1 as a main component.

* * * * *

UNITED STATES PATENT AND TRADEMARK OFFICE
CERTIFICATE OF CORRECTION

PATENT NO. : 12,269,946 B2
APPLICATION NO. : 17/486095
DATED : April 8, 2025
INVENTOR(S) : Y. Kanamori et al.

Page 1 of 1

It is certified that error appears in the above-identified patent and that said Letters Patent is hereby corrected as shown below:

In the Claims

Column 23, Line 13 (Claim 6, Line 10) please change "Pa's" to -- Pa·s --

Signed and Sealed this
Twenty-second Day of July, 2025

Coke Morgan Stewart
*Acting Director of the United States Patent and Trademark Office*